United States Patent
Winkelmann et al.

[15] 3,693,209
[45] Sept. 26, 1972

[54] WINDSHIELD WIPER UNIT

[72] Inventors: Herbert E. Winkelmann; Roy C. Bodem, both of Kettering, Ohio

[73] Assignee: General Motors Corporation, Detroit, Mich.

[22] Filed: June 18, 1971

[21] Appl. No.: 154,287

[52] U.S. Cl. .................. 15/250.21, 15/250.3, 74/75
[51] Int. Cl. ............................................. B60s 1/32
[58] Field of Search ............ 15/250.13, 250.3, 250.21, 250.27; 74/42, 75, 90

[56] References Cited

UNITED STATES PATENTS

| | | |
|---|---|---|
| 2,677,844 | 5/1954 | McGlasson, Sr. .... 15/250.27 X |
| 3,422,480 | 1/1969 | Kato ..................... 15/250.21 |
| 3,633,238 | 1/1972 | Parker .................. 15/250.21 |

Primary Examiner—Peter Feldman
Attorney—W. E. Finken et al.

[57] ABSTRACT

In a preferred form, this disclosure relates to a window wiping apparatus for wiping a tailgate window of a station wagon vehicle. The window wiping apparatus includes an oscillatable window wiper, a support means, a crank arm pivotally supported intermediate its ends by the support means for movement in opposite directions and which has one end pivotally connected to the wiper intermediate the ends of the latter, a drive mechanism operatively connected adjacent the other end of the crank arm for oscillating the same through a given angular extent, an arcuate stationary cam track on the support means and a cam follower means carried by the wiper adjacent its lower end and which is received in the cam track. The cam track guides the movement of the wiper as the latter is oscillated by the crank arm and causes the wipers to be oscillated through an arcuate extent which is substantially greater than the given angular extent the crank arm is rotated.

4 Claims, 4 Drawing Figures

PATENTED SEP 26 1972

3,693,209

INVENTORS
Herbert E. Winkelmann &
BY Roy C. Bodem

W.A. Schuetz
ATTORNEY

WINDSHIELD WIPER UNIT

The present invention broadly relates to a window wiping apparatus, and in particular to a window wiping apparatus having a window wiper which is pivotally connected intermediate its ends to an oscillating crank arm and slidably received at its lower end in a guide means or cam track so that when the crank arm is oscillated through a given angular distance the angular distance through which the window wiper is moved is substantially greater.

An important object of the present invention is to provide a new and improved window wiping apparatus which is of a relatively simple and economical construction, and in which a window wiper by virtue of its being pivotally connected intermediate its ends to an oscillating crank arm and slidably received at its lower end in a guide means is oscillated through an angular extent which is substantially greater than the angular extent of the movement imparted to the oscillating crank arm.

Another object of the present invention is to provide a new and improved window wiping apparatus, preferably for a tailgate window of a station wagon vehicle, and which comprises a window wiper which is adapted to be oscillated across the window, a support means, a crank arm pivotally supported intermediate its ends by the support means and pivotally connected at one end to the window wiper intermediate the ends of the latter, a drive mechanism operatively connected to the crank arm adjacent its other end for oscillating the same through a given angular extent, an arcuate stationary cam track carried by the support means and a cam follower means carried by the wiper adjacent its lower ends and which is received within the cam track, and in which the cam track is constructed and arranged such that it guides the movement of the wiper as the latter is oscillated by the crank arm and causes the wipers to be oscillated through an arcuate extent which is substantially greater than the given angular extent through which the crank arm is rotated.

The present invention further resides in various novel constructions and arrangement of parts, and further objects, novel characteristics and advantages of the present invention will be apparent to those skilled in the art to which it relates and from the following detailed description of the illustrated embodiments thereof made with reference to the accompanying drawings forming a part of this specification and in which similar reference numerals or characters are employed to designate corresponding parts throughout the several views, and in which.

Figure 1:
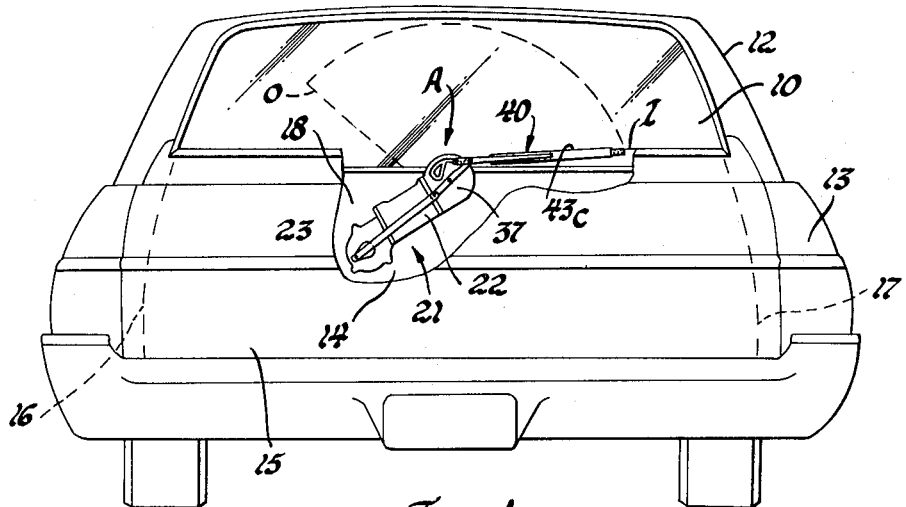
FIG. 1 is a fragmentary rear elevational view of a station wagon vehicle embodying the novel window wiping apparatus of the present invention.

As representing a preferred embodiment of the present invention the drawings show a window wiping apparatus A for wiping a tailgate window 10 of a station wagon vehicle 12. The rear window 10 is slidably supported by a tailgate 13 for movement between a closed position, as shown in FIG. 1, and an open position in which the window is substantially disposed within the tailgate 13. The tailgate 13 includes inner, outer and side walls 14–17, respectively. The walls 14–17 define a compartment 18 and the outer wall 14 and the window 10 define therebetween an elongated slot in communication with the compartment 18 and which extends laterally across the tailgate 13.

The window wiping system A is suitably supported by the tailgate 13 and comprises a drive mechanism 21 including a suitable unidirectional D.C. motor 22 and a gear reduction unit 23. The gear reduction unit 23 has an output shaft 24 which is secured to one end of a crank arm 25. The other end of the crank arm 25 is pivotally connected to one end of a drive link 26 via pivot pin means 27. The other end of the drive link 26 is pivotally connected to one end of a crank arm 30 via pivot pin means 32. The crank arm 30 is pivotally supported intermediate its ends via a drive pivot or pivot pin means 36, the drive pivot 36 being rotatably supported by a support bracket or means 37 secured to the motor 22. The crank arm 30 at its other end is pivotally connected to a window wiper 40 intermediate the ends of the latter by a pivot pin means 42.

The window wiper 40 could be of any suitable or conventional construction and is hereshown as comprising a wiper arm 43 having spring hinge connected inner and outer sections 43a and 43b for biasing a wiper blade assembly 43c carried by the outer arm section 43b against the outer surface of the tailgate window 10. The pivotal connection between the window wiper 40 and the crank arm 30 is intermediate the ends of the wiper arm section 43a.

When the electric motor 22 is energized the crank arm 25 is adapted to be rotated in the direction of the arrow 50. Rotation of the crank arm 25 in the direction of the arrow 50 causes the drive link and the crank arm 30 to be oscillated about the axis of the pivot pin means 36. Oscillation of the crank arm 30 in turn causes the wiper 40 to be oscillated across the outer surface of the window 10.

Figure 2:
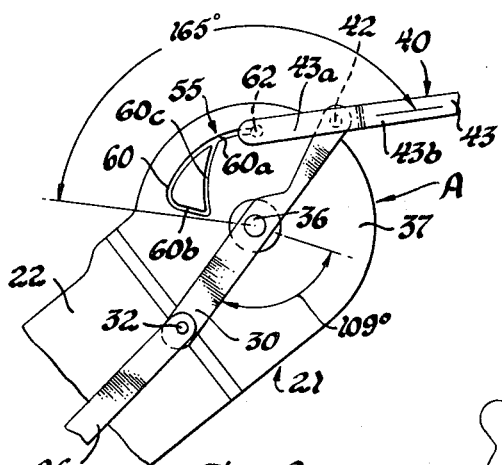
FIG. 2 is an enlarged fragmentary elevational view of part of the window wiping apparatus shown in FIG. 1.
Figure 3:
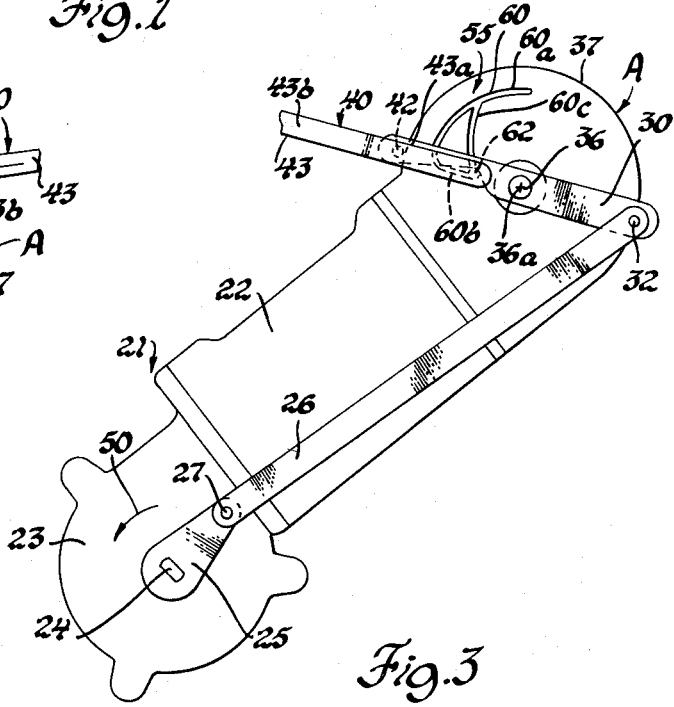
FIG. 3 is an enlarged elevational view of part of the window wiping apparatus shown in FIG. 1 showing different parts thereof in different positions than that shown in FIG. 2.

In accordance with the provisions of the present invention, a cam guide arrangement 55 is provided to effect oscillatory movement of the wiper 40 through an angular extent which is substantially greater than the angular extent through which the crank arm 30 is oscillated. The cam guide arrangement comprises a stationary cam track 60 in the support means 37 which is radially spaced from the axis 36a of the pivot pin means 36 and a cam follower means 62 carried by the wiper 40 adjacent its lower end and which is slidably received within the cam track 60. As shown in FIGS. 2 and 3, the cam track 60 includes a first or outer portion 60a which is arcuate and concentric or substantially concentric with respect to the axis 36a of the pivot pin means 36, a second portion 60b which extends from adjacent one end of the outer cam track portion 60a radially inwardly toward the axis 36a of the pivot pin means 36 and a third slightly curved portion 60c which extends from adjacent the end of the cam track portion 60b remote from the cam track portion 60a toward the midpoint of the cam track portion 60a.

The cam follower means 62 comprises a roller or pin rotatably supported by the lower end of the wiper arm and with the roller being received within the cam track 60.

As best shown in FIG. 1, the wiper 40 is adapted to be oscillated between inboard and outboard positions, designated by the letters I and O respectively. The inboard position I is also the park position of the wiper 40 and, when in its inboard position I, it is disposed within the slot or chamber 18 so as to be concealed from view.

When the wiper 40 is in its inboard position, as shown in FIGS. 1 and 2, it is disposed adjacent the lower edge of the tailgate window 10 and the cam follower 62 is disposed within the rightmost end of the track portion 60a of the cam slot 60. When the wiper 40 is moved from its inboard position I toward its outboard position O, the cam follower 62 follows the contour of the outer track portion 60a. When the cam follower reaches the end of the cam track portion 60a it will move radially inwardly along the cam track portion 60b. As shown in FIG. 3, when the cam follower 62 reaches the end of the cam track portion 60b adjacent the pivot pin means 36, the wiper 40 will be in its outboard position O. During the return movement of the wiper 40 from its outboard position O to its inboard position I the cam follower 62 will follow the cam track portion 60c and then the rightmost section of the cam track portion 60a until it reaches its inboard position I, as shown in FIG. 2. Due to the load imposed on the wiper blade assembly 43c as it is moved across the window 10, the cam follower 62 will at all times be urged into engagement with the outer surface of the cam track portions 60a, 60b and 60c.

The provision of the cam track 60 effects an angular movement of the wiper 40 through an angular extent which is substantially greater than the angular extent through which the crank arm 30 is oscillated. For example, in the illustrated embodiment shown in FIGS. 2 and 3, the angular extent through which the crank arm 30 is oscillated is 109°. With the crank arm 30 rotated through an angular extent of 109° and the construction and arrangement of the cam track 60, as shown in the drawings, the angular extent through which the wiper 40 is moved is 165°. Thus, the provision of the cam guide arrangement 55 enables the wiper 40 to be moved through an angular extent which is substantially greater than the angular extent through which the crank arm 30 is moved.

Figure 4:
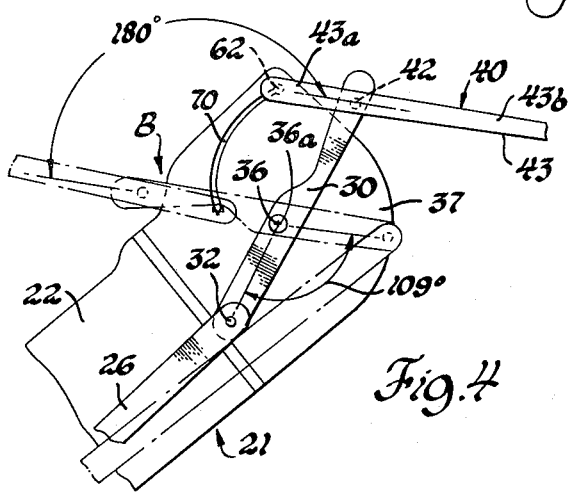
FIG. 4 is an enlarged fragmentary elevational view of an alternate embodiment of a novel window wiping apparatus of the present invention.

FIG. 4 shows a modified form or windshield wiping apparatus B which can be used in place of the windshield wiping apparatus A previously described. The windshield wiping apparatus B is of an identical construction to the windshield wiping apparatus A except for the configuration of the cam track 70 and hence, parts thereof corresponding to parts of the wiping apparatus A will be given the same reference numerals. In the windshield wiping apparatus B the cam track 70 is merely an arcuately extending cam track whose radius from the axis of the pivot pin means 36 progressively increases from its lower end towards its upper end. In this modified cam track 70 the angular extent through which the window wiper 40 is moved is 180° while the crank arm 30 is rotated through an angular extent of 109°. In all other respects, the window wiping apparatus B operates in the same manner as that previously described with respect to the window wiping apparatus A.

It will, of course, be understood that energization and de-energization of the motor 22 is preferably controlled by a suitable, manually manipulatable on-off switch (not shown) and that a conventional park switch (not shown) is provided to keep the motor 22 energized upon the on-off switch being moved to its off position until the wiper 40 reaches its inboard position I.

From the foregoing, it should be apparent that a novel window wiping apparatus has been provided for effecting an angular movement of a window wiper through an angular extent which is substantially greater than the angular extent imparted to its drive member or crank arm for oscillating the same.

Although the illustrated embodiment thereof has been described in great detail, it should be apparent that certain modifications, changes, and adaptations may be made in the illustrated embodiment, and that it is intended to cover all such modifications, changes and adaptations which come within the spirit of the present invention.

What is claimed is:

1. A window wiping apparatus for wiping a window of an automotive vehicle comprising: a window wiper which is adapted to be oscillated across the window between inboard and outboard positions; a support means; a pivot pin means rotatably supported by said support means; a crank arm pivotally supported intermediate its ends by said pivot pin means for movement in opposite directions; a drive mechanism operatively connected adjacent one end of said crank arm for oscillating the same through a given angular extent; said wiper being pivotally connected intermediate its end to the other end of said crank arm; said support means having an arcuate stationary cam track which is radially spaced from said pivot pin means; a cam follower means carried by said wiper adjacent its lower end and which is received in said cam track; said cam track guiding the movement of said wiper as the latter is oscillated by said crank arm and being effective to oscillate said wipers through an arcuate extent which is substantially greater than the given angular extent through which the crank is rotated.

2. A window wiping apparatus for wiping a window, such as a tailgate window, of an automotive vehicle comprising: a window wiper which is adapted to oscillated across the window between inboard and outboard positions; a support means; a pivot pin means pivotally supported by said support means; a crank arm secured to said pivot pin means intermediate its ends for movement in opposite directions; a drive mechanism operatively connected adjacent one end of said crank arm for oscillating the same through an angular extent of approximately 109°; said wiper being pivotally connected intermediate its ends to the other end of said crank arm; said support having an arcuately stationary cam track which is radially spaced from said pivot pin means; a cam follower means carried by said wiper adjacent its lower end and which is received in said cam track, said cam track guiding the movement of said wiper as the latter is oscillated by said crank arm and being effective to oscillate the wiper through an arcuate extent of at least 165° in response to said crank arm being rotated through an angular extent of approximately 109°.

3. A window wiping apparatus for wiping a window, such as a tailgate window, of an automotive vehicle comprising: a window wiper which is adapted to be oscillated across the window between inboard and outboard positions, a support means; a drive pivot pivotally supported by said support means; a crank arm secured to said drive pivot intermediate its ends for movement in opposite directions, a drive mechanism operatively connected adjacent one end of said crank arm for oscillating the same through a given angular extent; said wiper being pivotally connected intermediate its ends to the other end of said crank arm; said support means having an arcuate stationary cam track thereon, said cam track having an outer first track portion which is substantially concentric with respect to said drive pivot, a second portion which extends generally radially of said drive pivot adjacent one end of said first portion and a third portion extending from the end of said second portion remote from said first portion toward the first portion midway of the latter, a cam follower means carried by said wiper adjacent its lower end and which is received in said cam track, said cam track guiding the movement of said wiper as the latter is oscillated by said crank arm and being effective to oscillate said wiper through an arcuate extent which is substantially greater than the given angular extent the crank arm is rotated.

4. A window wiping apparatus for wiping a window, such as a tailgate window, of an automotive vehicle comprising: a window wiper which is adapted to be oscillated across the window between inboard and outboard positions; a support means; a crank arm; pivot pin means carried by said support means for pivotally supporting the crank arm intermediate its ends for movement in opposite directions; a drive mechanism operatively connected adjacent one end of said crank arm for oscillating the same through a given angular extent; said wiper being pivotally connected intermediate its ends to the other end of said crank arm; said support means including an arcuate stationary cam track which is radially spaced from said pivot pin means and whose radius with respect to said pivot pin means progressively increases from one end of said cam track toward the other end; a cam follower means carried by said wiper adjacent its lower end and which is received in said cam track; said cam track guiding the movement of said wiper as the latter is oscillated by said crank arm and being effective to oscillate said wipers through an arcuate extent which is substantially greater than the given angular extent of the crank arm.

* * * * *